W. DRUMMOND.
Corn-Planter.
No. 20,781.
Patented July 6, 1858.
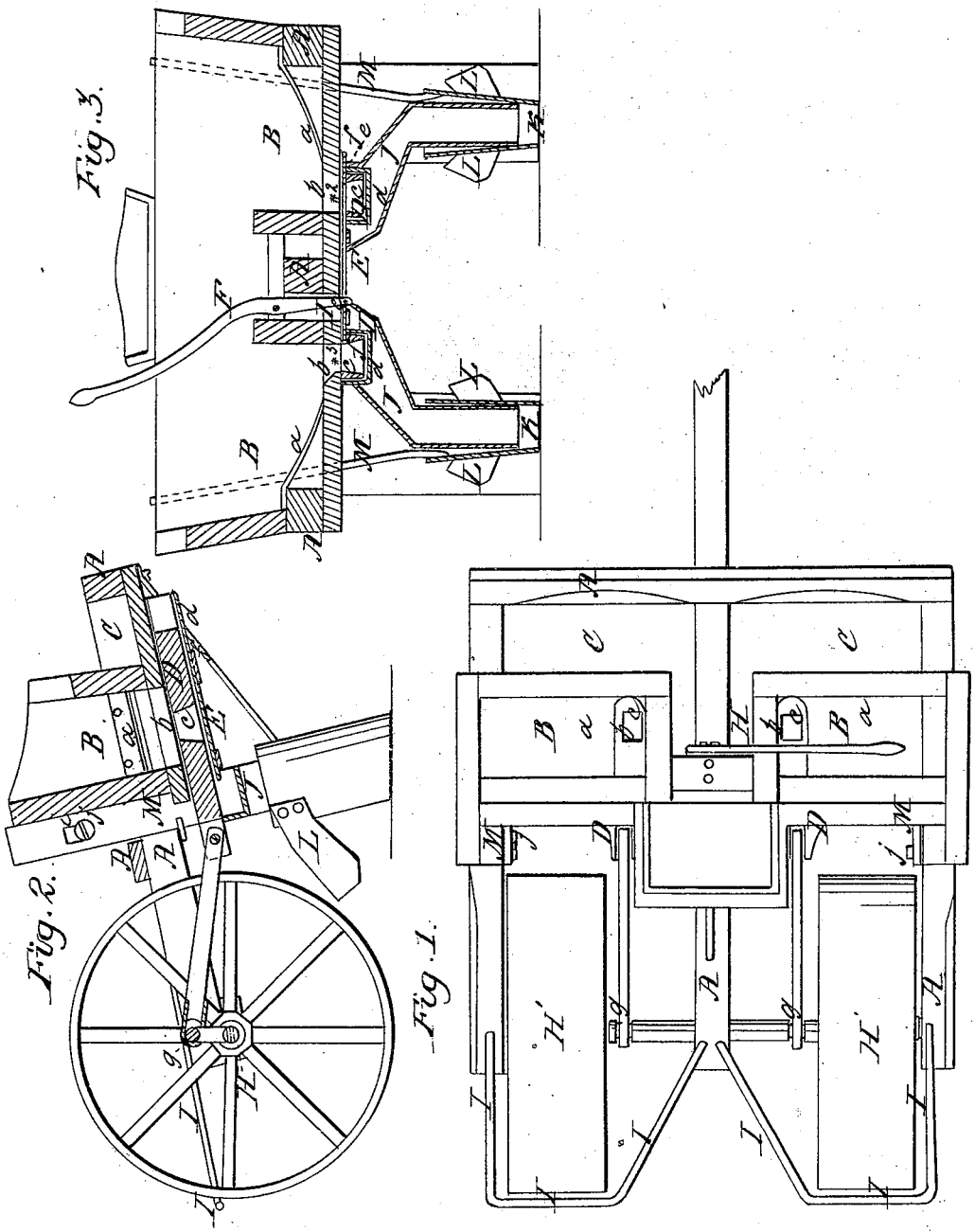

UNITED STATES PATENT OFFICE.

W. DRUMMOND, OF WOODBRIDGE, NEW JERSEY.

IMPROVEMENT IN CORN-PLANTERS.

Specification forming part of Letters Patent No. 20,781, dated July 6, 1858.

*To all whom it may concern:*

Be it known that I, WARREN DRUMMOND, of Woodbridge, in the county of Middlesex and State of New Jersey, have invented a new and useful Improvement in Corn-Planters; and I do hereby declare that the following is a full, clear, and exact description of the same, reference being had to the accompanying drawings, forming a part of this specification, in which—

Figure 1 is a plan of a corn-planter constructed with my improvements. Fig. 2 is a vertical longitudinal section of the same. Fig. 3 is a vertical transverse section of the same.

Similar letters of reference in each of the several figures indicate corresponding parts.

My invention consists simply in the particular manner hereinafter described of combining and arranging two dropping-slides, a double-acting and cut-off plate, a double-crank axle, two covering-rollers, a device which serves as a brace to the frame and for scraping the dirt from the periphery of the covering-rollers, two adjustable furrow-opening and furrow-closing tubes, and secondary hoppers for holding corn to resupply the main hoppers whenever they are exhausted.

To enable others skilled in the art to make and use my invention, I will proceed to describe its construction and operation.

A represents the frame of the machine; B B, the main or planting hoppers, arranged at each side of the frame; C C, the secondary hoppers, in which corn is placed in order to resupply the hoppers whenever they are exhausted. The main hoppers have inclined bottoms $a$ $a$, and, as usual, each is furnished with a discharge-hole, $b$.

D D are two distributing-slides arranged in guide-tubes $d$ $d$ under the bottoms of the hoppers. These slides have downwardly-flaring discharge-passages $c$ $c$ in them, for the corn to fall into while they are under the holes $b$ $b$ of the hoppers and to escape from freely when the passages $c$ $c$ are over the conducting or planting tubes.

It will be observed that the tubes in which the slides are arranged are open at their front ends, and therefore the length of the movement of the slides may be varied as desired without any inconvenience, and also that any dirt or other choking substance will be worked forward and discharged at said open end, owing to the tubes, when the machine is in operation and its shares some depth in the ground, being inclined in a reverse manner to what they are erroneously shown in Fig. 2 of the drawings.

E is the cut-off plate. It is cut away at its center, as shown by $e$ $e$, so that only a narrow solid portion, $f$ $f'$, shall be left on each side of the space $e$ $e$. This plate, by being thus constructed, answers as a cut-off for both hoppers, for when it is shifted to the right and occupies the position shown in Fig. 3 the solid portion $f$ will be at * and the other, $f'$, at *', thus leaving both passages of the hopper unclosed; and when the plate is shifted to the left, and the solid portion $f$ is at *$^2$ and the solid portion $f'$ at *$^3$, both passages will be closed. The shifting of the plate is accomplished by means of the lever F, which is connected to the slide and made to extend up alongside the driver's seat G, which is situated between the two main hoppers, as shown.

H is the propelling-axle. It is arranged at the rear of the machine, and has two covering and propelling rollers, H' H', arranged fast upon it. This axle has two crank-wrists, $g$ $g$, formed upon it. To these wrists the distributing-slides are connected by means of pivoted connecting-rods $h$ $h$, as shown.

I is a brace connecting the rear ends of the central and two side timbers of the frame A in a manner to brace the same, and also being shaped so as to scrape dirt from the periphery of both of the propelling-rollers, as shown in Figs. 1 and 2.

J J are the corn-conducting tubes of the hopper, and K K are the furrow-openers, with firmly-attached wings L L for closing up the furrows after the seed is dropped. These shares K L are fastened to vertical bars M M, which are attached by means of slots and set-screws $i$ $i$ $j$ $j$ to the side timbers of the frame in a manner to be conveniently adjusted up and down by the driver, while he is on the machine, whenever he desires to have the furrow-openers run into the ground deeper or shallower.

This machine, it is true, resembles, so far as the functions performed are concerned, closely many machines of a similar character before patented; but it differs from all others in its compact and convenient arrangement and simplicity, and in not being liable to get out of order.

What I claim as my invention, and desire to secure by Letters Patent, is—

The particular manner herein described of arranging and combining for united use only the two dropping-slides D D, double-acting cut-off plate E $e$ $e$ $f$ $f'$, double-crank axle H $g$ $g$, covering-rollers H' H', combined brace and scraper I, adjustable furrow opening and closing tubes or shares K L, and secondary hoppers C C, for the purpose set forth.

The above specification of my improvement in corn-planters signed by me this 6th day of May, 1858.

WARREN DRUMMOND.

Witnesses:
G. YORKE ATLEE,
WM. ATLEE.